US007249712B2

(12) United States Patent
Ingalls (10) Patent No.: US 7,249,712 B2
(45) Date of Patent: Jul. 31, 2007

(54) INVENTORY CONTROL SYSTEM FOR BODY ART STUDIO

(75) Inventor: Doug Ingalls, Windermere, FL (US)

(73) Assignee: Baking Entertainment, LLC, Orlando, FL (US)

( * ) Notice: Subject to any disclaimer, the term of this patent is extended or adjusted under 35 U.S.C. 154(b) by 578 days.

(21) Appl. No.: 10/811,105

(22) Filed: Mar. 26, 2004

(65) Prior Publication Data

US 2005/0234751 A1 Oct. 20, 2005

(51) Int. Cl.
*G06K 7/10* (2006.01)
(52) U.S. Cl. .................. 235/462.01; 705/22; 705/28
(58) Field of Classification Search ........... 235/462.01, 235/385, 454; 705/16, 22, 23
See application file for complete search history.

(56) References Cited

U.S. PATENT DOCUMENTS

| 4,079,893 A | 3/1978 | Bass |
| 5,248,096 A | 9/1993 | Hoey et al. |
| 5,401,960 A | 3/1995 | Fisun et al. |
| 5,423,206 A | 6/1995 | Hetzel |
| 5,816,269 A | 10/1998 | Mohammed |
| 5,817,385 A | 10/1998 | Stanislav |
| 5,944,893 A | 8/1999 | Anderson |
| 6,013,122 A | 1/2000 | Klitzman et al. |
| 6,213,131 B1 | 4/2001 | Vien et al. |
| 6,341,831 B1 | 1/2002 | Weber et al. |
| 6,354,517 B1 | 3/2002 | Wu |
| 2003/0024679 A1 | 2/2003 | Cantwell |

FOREIGN PATENT DOCUMENTS

| EP | 0 201 683 | 11/1986 |
| JP | 55137175 A2 | 10/1980 |
| WO | WO 99/56682 | 11/1999 |

*Primary Examiner*—Michael G. Lee
*Assistant Examiner*—Kristy A. Haupt
(74) *Attorney, Agent, or Firm*—Sacco & Associates PA (57) ABSTRACT

A method for operating a tattoo studio includes identifying a customer selection of a tattoo design and a bin designator for a stencil for the tattoo design; locating a storage bin containing a stencil for the tattoo design; and scanning a bar code assigned to the stencil. The method can also include scanning at least a second barcode associated with a tattoo enhancement including a non-standard paint, an additional paint color, or a mixture of paint colors. Inventory control is verified using a match code and pre-packaged sets of numbered stencils.

30 Claims, 6 Drawing Sheets

Tatoo Design No. _____ 3.00
Additional Ink Color _____ 1.00

Total 4.00

Tatoo Care Instructions:
_______________
_______________

INVENTORY CONTROL SYSTEM FOR BODY ART STUDIO

BACKGROUND OF THE INVENTION

1. Technical Field

This invention concerns body art studios and more particularly a process for controlling inventory and preventing employee theft in a body art studio.

2. Description of the Prior Art

In recent years, body art studios that apply temporary artwork to human bodies have become increasingly popular. The temporary artwork or "tattoos" as they are commonly known can be applied to an individual's skin by various means. For example, the use of adhesive transfers and airbrush paints are well known for this purpose. Adhesive transfers are applied by simply positioning a decal on an individual's skin. Airbrush paints are generally applied using stencils that can be positioned on an individual's skin while the airbrush work is performed.

Many customers prefer tattoos that are applied using airbrush techniques as compared to adhesive transfers because the overall look and experience of the application can be more similar to the mystique associated with the application of a permanent tattoo. Accordingly, airbrush tattoo studios are becoming increasingly popular in a wide variety of venues including theme parks, shopping centers, and vacation destinations.

Many of airbrush tattoo studios are set up as small kiosks, stands or booths that are situated in high traffic areas. These studios are often operated by part time or hourly employees. Their job responsibilities include assisting customers with the selection of tattoo designs and ink colors, operating the airbrush equipment to apply the temporary tattoos, and recording the sale using a conventional cash register. However, one problem encountered by management personnel charged with responsibility for the efficient operation of such tattoo studios relates to the problem of employee theft. For example, it can be difficult for management to track the number of temporary tattoos applied by an employee on any given day. This creates the potential for employee theft. In particular, an employee may apply one or more tattoos over the course of the day, charge customers for such tattoos, and then pocket the receipts for the sale without recording the transaction in the cash register. This is a serious problem that can adversely impact the overall profits associated with the operation of the tattoo studio. Further, even if the employees operating the studio are behaving in an honest way, they cannot always be relied upon to accurately record the particular tattoo design that is applied for each customer. This can create an inventory control problem, the nature of which is described in more detail below.

For the purpose of applying an airbrush tattoo, one or more different types of color dye can be sprayed through the stencil openings to form a temporary tattoo on the skin surface. Conventional stencils can be re-usable and are simply held in position next to a person's skin while the airbrush work is performed. More recently, single use adhesive stencils have become more popular. For example, U.S. Pat. No. 5,816,269 discloses a tattoo stencil mechanism with an adhesive backing for temporary attachment to a person's skin while a stencil is being applied.

Although there are clear advantages to the use of single use adhesive stencils, they also create an inventory control problem. A typical airbrush tattoo studio can have a wide variety of available tattoo designs. For example, more than one hundred different designs may be available for customers to choose from. In order to ensure that customers are not disappointed, a substantial inventory of single use adhesive stencils must be maintained at the studio. Enough stencils for each tattoo design must be on hand at all times to ensure that supplies are not exhausted. Lead times for ordering more stencil inventory can require that a tattoo studio operator be provided with advance notice of when supplies are running low of a particular design. Tracking and maintaining this inventory of stencils at all times can be problematic under normal circumstances and can become particularly difficult in those instances where employee theft is occurring.

SUMMARY OF THE INVENTION

The invention includes a method for operating a tattoo studio. The method can begin by identifying a customer selection of a tattoo design from a product display unit. A bin designator can thereafter be identified for the tattoo design from a schedule associated with the product display unit. The bin designator can be used to locate a storage bin containing a stencil for the tattoo design. The method can also include scanning a bar code assigned to the stencil and scanning at least a second barcode associated with a tattoo enhancement. For example, the tattoo enhancement can be a non-standard paint, an additional paint color, or a mixture of paint colors. Finally, a sale can be registered based on a price determined by the scanning steps.

According to one aspect of the invention, the bin designator schedule can be combined with the product display unit by displaying the bin designator adjacent to a tattoo design on the display unit. According to another aspect of the invention, the stencil can be selected by the operator of the studio from among a plurality of different types of stencils contained in the bin. Thus, one bin designator can be used to refer to a bin that contains a relatively small number of different types of stencils.

According to another aspect of the invention, customers can be provided with receipts that include at least a total cost of said tattoo and tattoo care instructions. Further, signage can be displayed to inform customers that tattoo care instructions are provided on the receipt. In this way, customers are prompted to request the receipt if one is not offered by an attendant.

According to another aspect of the invention, stencils can be stored in pre-packaged sets, and each set can contain a total of exactly n stencils. For example, n can be selected to be a number in the range from 6 to 18. Each of the stencils contained in each set can be uniquely marked with a number from 1 to n. Subsequently, it is possible to check whether a recorded number of stencils of a particular design that remain in inventory correlates to an actual number of stencils of a particular design remaining in inventory by calculating a match code and comparing the match code with the number of stencils remaining in an opened one of the prepackaged sets.

In an alternative embodiment, the invention can also include a tattoo studio kit that includes a display unit for displaying a plurality of tattoo designs and a bin designator schedule cross-referencing a bin designator with a tattoo design. The bin designator can identify a bin in which a stencil for the selected tattoo design is stored. At least one bar code can be disposed within arm's length of the bin and corresponding to one of said tattoo designs. At least a second bar code associated with a tattoo enhancement can also be provided. A scanner for reading said bar codes can be operatively connected to a cash register system for registering a sale based on a price determined by the bar codes.

The kit can also include a system for providing customers with a receipt that includes at least a total cost of said tattoo and tattoo care instructions. The receipt can be preprinted with tattoo care instruction or such information can be printed at the time the receipt is generated. At least one sign can also be included in the kit for informing customers that tattoo care instructions are provided on the receipt, whereby customers are prompted to request a receipt if one is not offered by an attendant.

The kit can also include pre-packaged sets of stencils, where each set contains a total of exactly n stencils. Further, the n stencils in each pre-packaged set can be numbered from 1 to n. According to yet another aspect of the invention, the kit can include a computing device for calculating a match code that corresponds to a number of stencils of a particular type that should be remaining in an opened one of said prepackaged sets.

DETAILED DESCRIPTION OF THE PREFERRED EMBODIMENTS

Figure 1:
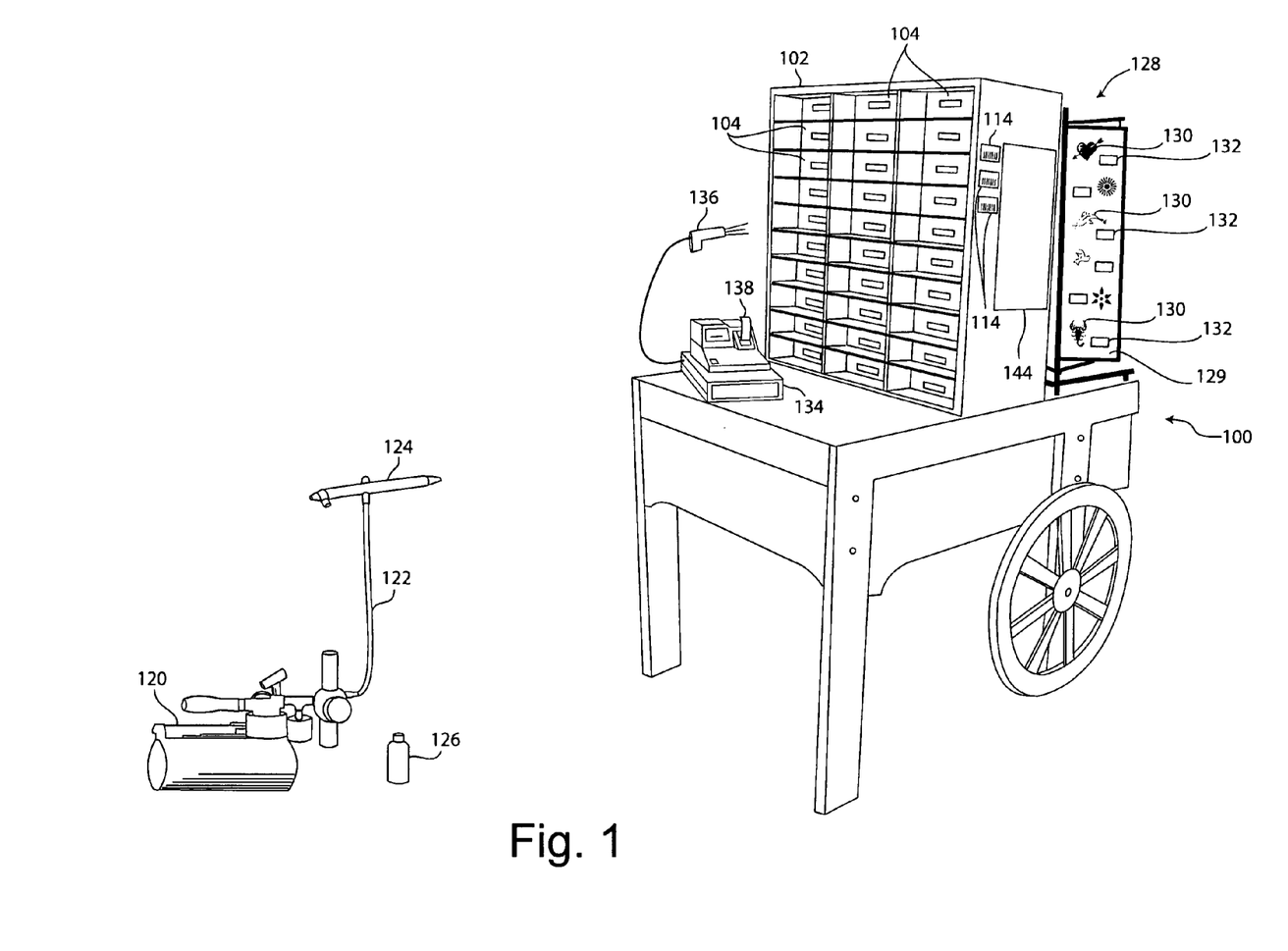
FIG. 1 is a drawing of a portable tattoo studio with a plurality of stencil bins that is useful for understanding the invention.

An example of a temporary body art studio 100 for use with the present invention is illustrated in FIG. 1. The temporary body art studio 100 is an example of a portable type studio. However, it should be understood that the invention is not limited in this regard. Rather, the inventive arrangements disclosed herein can be used in conjunction with any type of temporary body art studio regardless of whether it is fixed or portable. The body art studio 100 can include equipment and supplies for applying temporary airbrush tattoos. The equipment can include a compressor 120, air hose 122, air guns 124 and body paint 126 in various colors.

Figure 3:
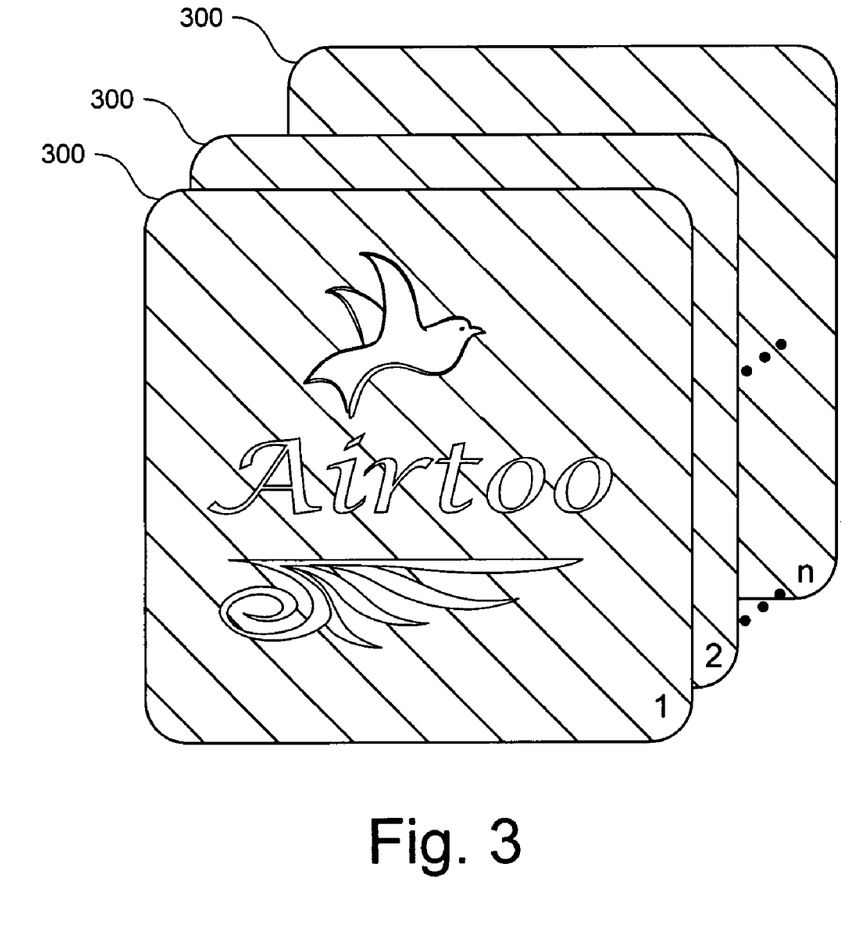
FIG. 3 shows a set of n stencils that can be used in the present invention.

As shown in FIG. 3, one or more stencils 300 can be provided at the body art studio 100 to assist in the application of the tattoos. Stencils 300 are preferably a disposable single use type design that includes an adhesive backing for being temporarily secured to a customer's skin while the tattoo is being applied. However, the invention is not limited in this regard and other types of stencils can also be used.

Since customers usually desire a wide selection of tattoo designs, a corresponding variety of stencils must be available at the body art studio at all times for applying temporary tattoo designs of various types. Accordingly, the body art studio 100 can include at least one storage cabinet 102 with a plurality of bins 104 provided therein for storing a number of different types of stencils. Each bin can contain a single type of stencil or a plurality of different stencil types.

Figure 2:
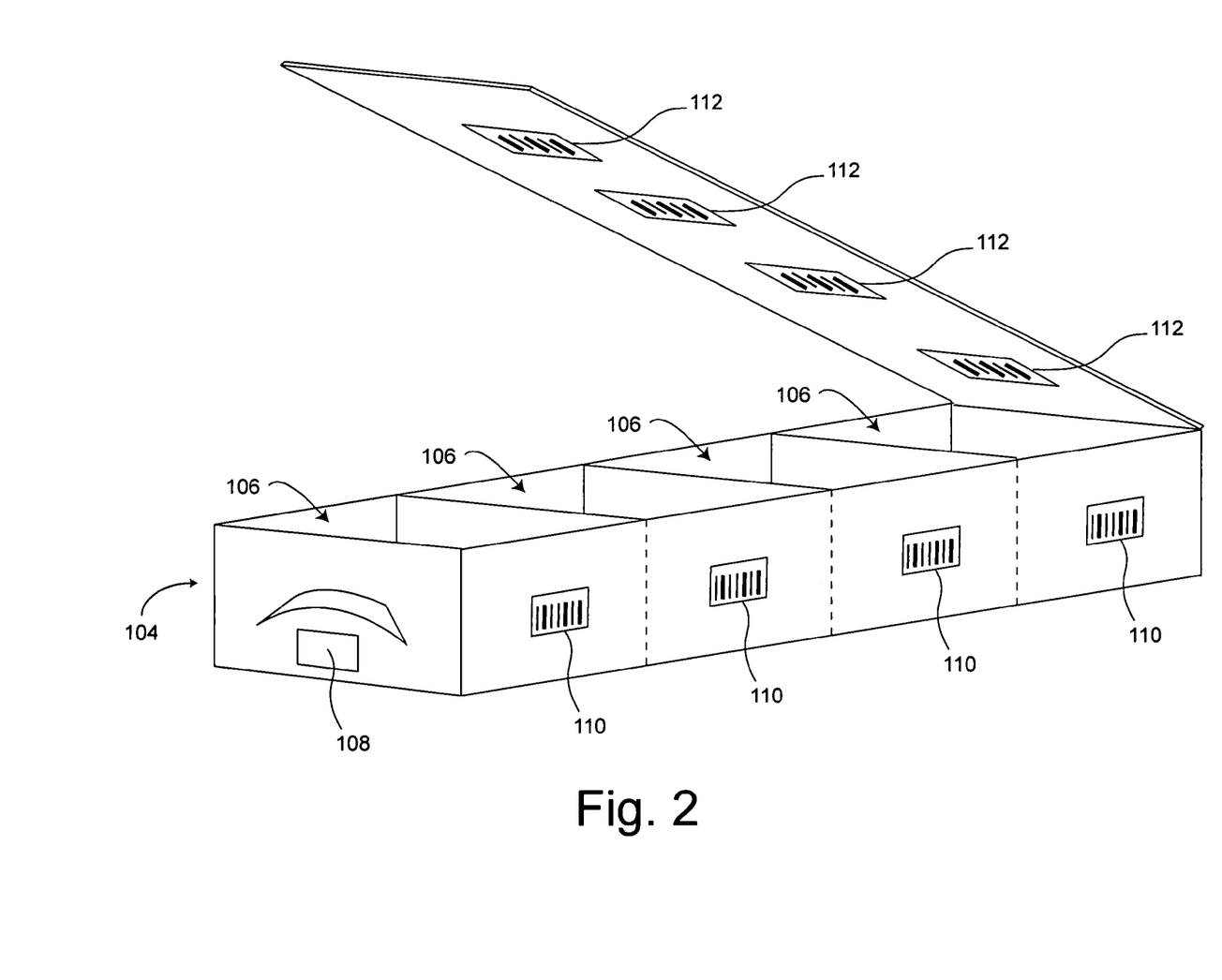
FIG. 2 is a drawing showing a tattoo stencil bin that is useful for understanding the invention.

Bins 104 can be any kind of storage unit, case or compartment suitable for containing at least one stencil. An example of a bin 104 is shown in more detail in FIG. 2. As illustrated therein, the bin can comprise a single compartment or can be sub-divided into a number of smaller compartments 106. One or more stencils 300 can be stored in each bin 104. For example, separate compartments 106 can be used for storing stencils 300 for each tattoo design. Each bin can be identified by a bin designator 108. A bin designator can be any identifier that is useful for allowing an operator to identify a particular bin or bins. For example an alpha-numeric sequence can be used for this purpose.

The body art studio 100 can also include at least one display unit 128 for displaying a variety of different tattoo designs 130 that can be applied at the body art studio. The display unit in FIG. 1 is a set of one or more flip charts 129 that customers can peruse to identify the particular tattoo design 130 that they wish to have applied. However, it will be readily appreciated by those skilled in the art that the invention is not limited in this regard. For example, the display unit 128 can be a catalog, a poster, or even a video display unit such as a cathode ray tube or an LCD type display. In fact, any suitable system can be used for this purpose, provided that it allows the image of the various tattoo designs to be displayed.

A bin designator schedule is advantageously provided that can be used to associate a particular tattoo design 130 from the display unit 128 with a specific bin designator. The bin designator schedule can be a separate chart that cross-references each tattoo design 130 to a bin designator so that the bin 104 containing the stencil for a particular tattoo design can be easily located. However, according to a preferred embodiment, the bin designator schedule can be incorporated into the display unit 128. For example, each tattoo design 130 can be displayed on the display unit 128 together with a corresponding bin designator 132 that indicates the particular bin 104 in which the stencil for that tattoo design can be found.

Each bin 104 can also have at least one bar code 110, 112 on or near the bin that corresponds to one or more of the stencils contained therein. According to an alternative embodiment, bar codes could be printed directly on the stencil. Additional bar codes 114 can be provided on or near the bins. For example, the additional bar codes can be placed anywhere in or around the body art studio 100. According to one embodiment shown in FIG. 1, the additional bar codes can be placed generally within arm's length of the bins for convenient scanning. The additional bar codes can be used to identify a tattoo enhancement. A tattoo enhancement can include any of a variety of additional features that can be associated with a tattoo applied to a person's skin. For example, a tattoo enhancement can include without limitation a non-standard paint, an additional paint color, and application of a custom paint color that comprises a mixture of paint.

The body art studio can also be provided with a cash register system 134 that includes a bar code scanner 136. The cash register system 134 preferably includes programmable memory in which is stored price data for a plurality of bar codes. Such bar code scanning systems are known in the art for convenient price look-up by sales clerks. By scanning bar codes 110, 112 assigned to each tattoo design 130, and additional bar codes 114 for any tattoo enhancement, it is possible to ensure that each item for which the customer is charged is accurately registered. Moreover, this step also ensures that a count is kept of each inventory item sold. A customer's tattoo design selection 130 and any enhancements can be conveniently entered into the cash register system using this technique. The cash register system can also include a price display and a printer for generating a receipt 138 based on any scanned bar codes.

Cash register systems as described herein are well known in the art and are commercially available from a variety of manufacturers. Such cash registers can be integrated with a bar code scanner for the purposes of the present invention, include memory to accommodate price look-ups, and have an integral printer for generating customer receipts. It is also well known in the art for such cash registers to include the ability to interface with a personal computer and various types of commercial accounting software by way of an integrated communications port. For example a serial port, wireless port, USB port or any other high speed data port can be used for this purpose. This interface capability allows accurate inventory record-keeping, but only to the extent that employees have registered all sales correctly.

As an alternative to a cash register based system, a hand-held bar code scanner can include memory and processing capabilities which allow the scanned bar code data to be stored within the bar code scanner. When the memory on the bar code scanner becomes full, or at a convenient time, such data can be downloaded directly to a computer by way of a communications port, without the need for any intervening cash register device.

One way to help control inventory and prevent employee theft is to ensure that employees accurately record each sale in the cash register system. This allows for convenient verification of inventory that has been sold and determination of proper cash receipts at the end of each day or each shift. Customers can help ensure that all sales are properly entered into the cash register by insisting upon being given a receipt for each sale. However, many customers fail to do so and as a result; the chances are increased for employee theft and loss of control over inventory.

Figure 4A:
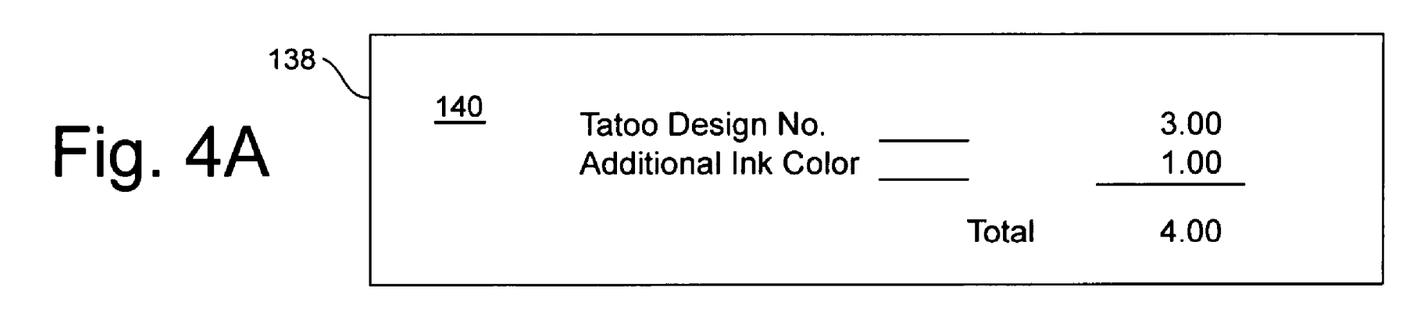
FIG. 4A shows a first side of a cash register receipt for use in the present invention.
Figure 4B:
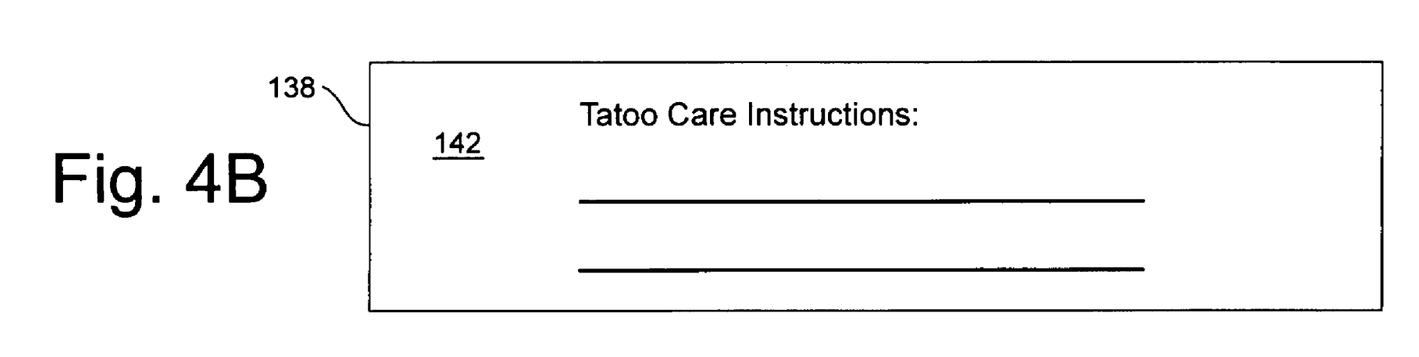
FIG. 4B shows a second side of a cash register receipt for use in the present invention.

In order to address the foregoing problem, customers can be encouraged to demand cash register receipts by printing directly on the receipt important information including care instructions for the temporary airbrush tattoo that has just been applied. Accordingly, the cash register receipt 138 can in one embodiment be pre-printed on one or both sides with care instructions for the tattoo. Alternatively, the cash register system can be programmed to automatically print the care instructions together with each receipt that is printed for a customer. Further, at least one sign 144 can be displayed on or in the vicinity of the body art studio 100 that informs customers that the tattoo care instruction are provided to them on their receipt. In this way, customers will be encouraged to ask employees for their receipt. FIG. 4 illustrates a receipt 138 that has been printed on a first side 140 with sale information and printed on a second side 142 with tattoo care instructions.

Figure 5:
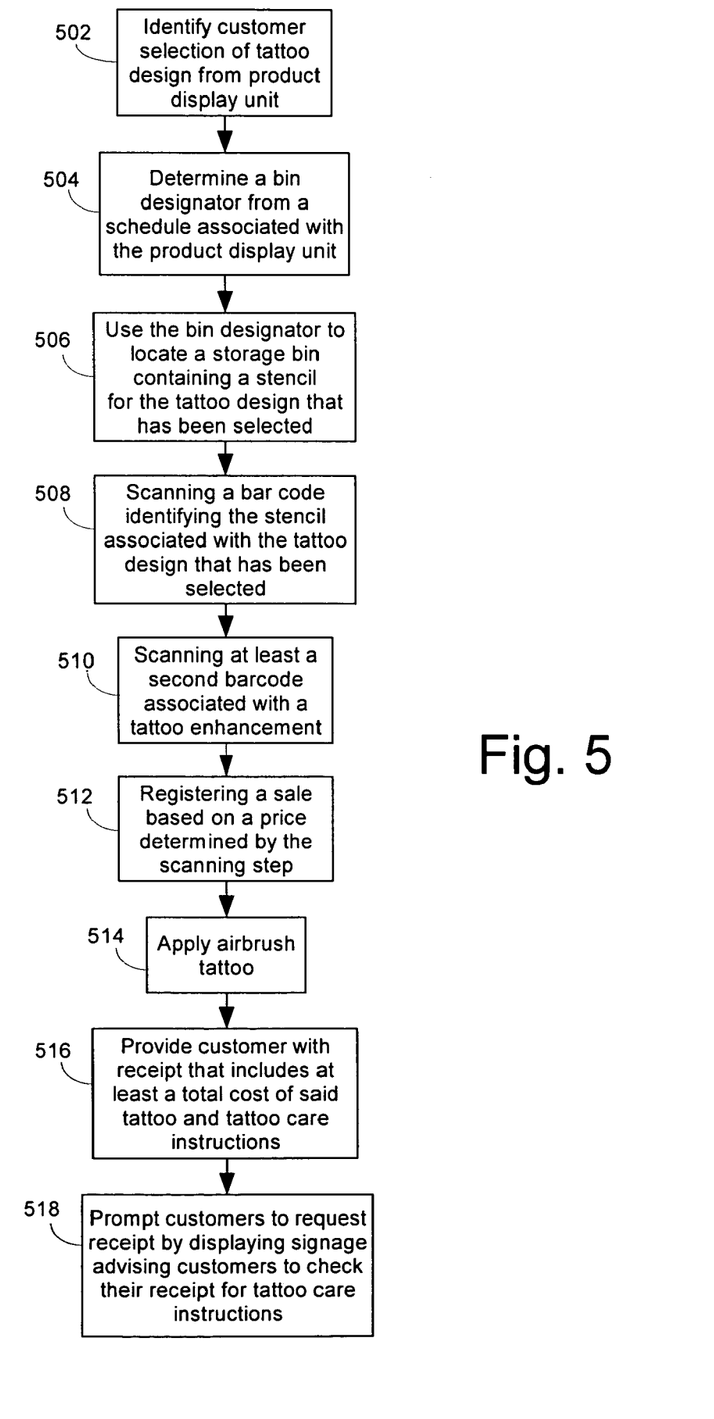
FIG. 5 is a flow chart that is useful for understanding a method for maintaining inventory control in a body art studio.

Referring now to the flowchart in FIG. 5, a process for maintaining inventory control and discouraging employee theft is illustrated. The process can begin in step 502 when an employee receives from a customer a selection of a tattoo design. The selection is preferably made from the display unit 128, but is not limited in this regard.

Once the customer's selection has been received, the employee can in step 504 determine a bin designator 132 based on the customer's selection. The bin designator 132 can be obtained from the bin designator schedule. As noted above, the bin designator schedule can be separate from or included with the display unit 128. In FIG. 1, the bin designator schedule is included as part of the display unit 128 by displaying the bin designator adjacent to each of the tattoo designs 130 as shown, thereby allowing for easy cross-reference.

In step 506, the bin designator 132 is used by an employee to locate the proper storage bin 104 that contains a stencil 300 for the particular tattoo design 130 that has been selected by a customer. Once the proper bin 104 has been located, the scanner 136 can be used in step 508 to scan a bar code associated with the stencil 300 that has been selected. The bar code 110, 112 can be located on the bin, near the bin, on the stencil or on the display unit. Thereafter, in step 510, at least one additional bar code 114 can be scanned to register the purchase by a customer of a tattoo enhancement.

In step 512, the sale that has been entered by the scanning steps can be registered in the cash register system 134. The scanning steps ensure that the correct price and inventory item are recorded. The process can continue in step 514 by applying the airbrush tattoo to the customer, and thereafter providing the customer in step 516 with a receipt 138. The receipt 138 advantageously includes at least a cost of the tattoo and tattoo care instructions. Finally, the process can include displaying signage at or near the body art studio 100 which alerts customers to the fact that tattoo care instructions are provided on their receipts. The signage encourages customers to demand receipts from the employees.

Figure 6:
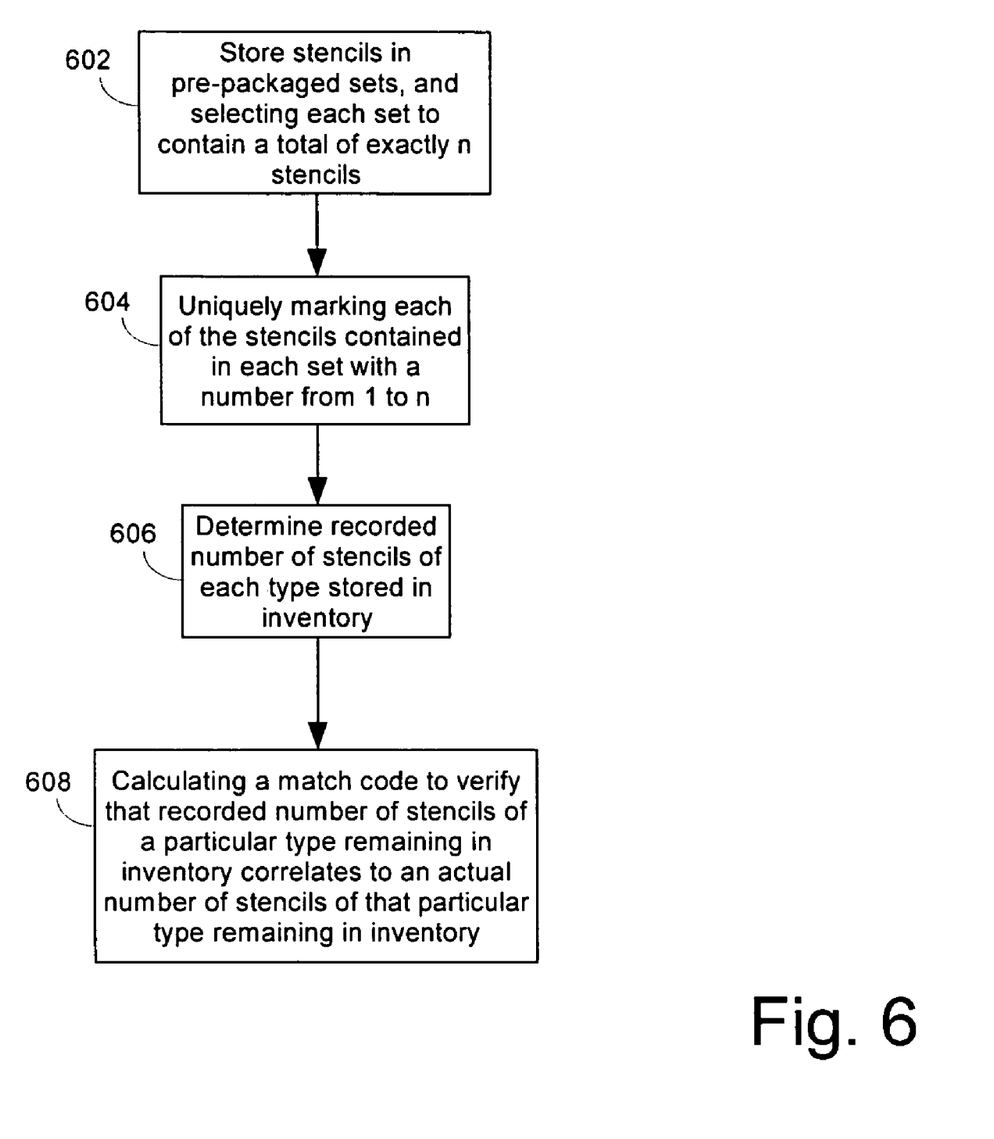
FIG. 6 is a flow chart that is useful for understanding a method for using a match code to verify that a recorded number of stencils of a particular type correlate to an actual number of stencils.

The invention shall now be described in relation to FIG. 3 and the flowchart in FIG. 6. More particularly, the process for inventory control can continue in step 602 by storing stencils 300 in pre-packaged sets containing exactly n identical stencils. In the present invention n can be any integer number. For example, values of in the range from about 6 to 18 are believed to provide a good balance between efficiency and ease of use of the invention. As recited in step 604 and shown in FIG. 3, the stencils 300 contained in each pre-packaged set can be consecutively numbered from 1 to n.

In step 606, inventory control personnel can determine based on inventory records a number of stencils of each type that are believed to be stored in inventory. This information can be obtained by manually evaluating the cash register records at the end of each day. However, an alternative approach can make use of the computer interface offered by many conventional cash register systems 134 that can allow the sales data from the register to be downloaded to a commercial accounting program. This data can be used by the computer to subtract the day's sales for each item from existing inventory figures to determine a new inventory figure for each item.

Alternatively, in step 606, inventory control personnel can control inventory by manually reviewing sales receipt data with specific style numbers recorded on those sales receipts. This process can involve a manual look-up system in which inventory control personnel can confirm the quantity of tattoo stencils that should remain in inventory after each day of sales. For example, this can be accomplished by beginning with the quantity of tattoo stencils recorded in inventory at the beginning of each day, subtracting from that amount the number of each style sold over the course of the day as evidenced by receipts or recorded bar code data, and comparing the remainder to the number of each tattoo stencil style remaining at the end of the day.

Regardless of how the current inventory is determined in step 606, the results can provide information regarding the number of units of each stencil 300 that should be present in inventory. However, employee errors and theft can result in unanticipated shortages of inventory that are only revealed by a manual count of actual inventory items. In order to provide a means to check whether an inventory record is accurate, a match code can be computed in step 608 for each particular stencil type in inventory. The match code can be computed by determining the number of stencils that should be remaining in any opened set of pre-packaged stencils for a particular tattoo design. For example, this value could be computed by dividing a number representing the total inventory for the particular stencil type by the value of n and calculating a remainder value. This remainder value should be equal to the number of units in any open pre-packaged set of stencils.

As an example, consider the case where n=12 and inventory records reflect that there should be 67 stencils of a particular type remaining in inventory. In that case: 67÷n=5, with 7 left over. In this case, 7 is the match code. This match code should be equal to the actual number of units remaining in any open pre-packaged set of the stencils. The absence of a match indicates an inventory problem. The value of the foregoing system is further maximized by consecutively numbering the stencils in each pre-packaged set from 1 to n as shown in FIG. 3. If the stencils in each set are always used beginning with the highest number n first, then the highest remaining number in the set should always equal the match number. This solves the problem of counting stencils after each day or after each employee shift, while providing a convenient inventory check system.

What is claimed is:

1. A method for operating a tattoo studio comprising the steps of:
   identifying a customer selection of a tattoo design from a product display unit;
   identifying a bin designator from a schedule associated with said product display unit;
   using said bin designator to locate a storage bin containing a stencil for said tattoo design;
   scanning at said storage bin a bar code assigned to said stencil;
   scanning at least a second barcode associated with a tattoo enhancement;
   registering a sale based on a price determined by said scanning steps.

2. The method of claim 1 further comprising the step of combining said bin designator schedule with said product display unit by displaying said bin designator adjacent to a tattoo design on said display unit.

3. The method of claim 1 further comprising the step of selecting said stencil from among a plurality of different types of stencils contained in said bin.

4. The method of claim 1 further comprising the step of selecting said tattoo enhancement from the group consisting of a non-standard paint, an additional paint color, and a mixture of paint colors.

5. The method of claim 1 further comprising the steps of:
   providing said customer with a receipt that includes at least a total cost of said tattoo and tattoo care instructions.

6. The method of claim 5 further comprising the step of displaying signage sufficient to inform customers that tattoo care instructions are provided on said receipt, whereby consumers are prompted to request said receipt if one is not offered by an attendant.

7. The method of claim 1 further comprising the step of storing said stencils in pre-packaged sets, and selecting each set to contain a total of exactly n stencils.

8. The method of claim 7 further comprising the step, of uniquely marking each of said stencils contained in each said set with a number from 1 to n.

9. The method of claim 7 further comprising the step of verifying that a recorded number of stencils of a particular design remaining in inventory correlates to an actual number of stencils of a particular design remaining in inventory by calculating a match code and comparing said match code with the number of stencils remaining in an opened one of said prepackaged sets.

10. The method of claim 7 further comprising the step of selecting n to be in the range from 6 to 18.

11. A method for operating a tattoo studio comprising the steps of:
    receiving a customer selection of a tattoo design;
    determining a bin designator based on said selection;
    using said bin designator to locate a storage bin containing a stencil for said tattoo design that has been selected;
    scanning a bar code associated with said stencil that has been selected;
    registering a sale based on a price determined by said scanning step; and
    providing said customer with a receipt that includes at least a total cost of said tattoo and tattoo care instructions.

12. The method according to claim 11 further comprising the step of scanning at least a second barcode associated with a tattoo enhancement, and registering said sale based on at least said first and second barcodes that have been scanned.

13. The method of claim 12 further comprising the step of selecting said tattoo enhancement from the group consisting of a non-standard paint, an additional paint color, and a mixture of paint colors.

14. The method of claim 11 further comprising the step of displaying signage sufficient to inform customers that tattoo care instructions are provided on said receipt, whereby consumers are prompted to request said receipt if it is not offered by an attendant.

15. The method according to claim 11 further comprising the step of positioning said barcode at least one of on or near said bin containing said stencil.

16. The method of claim 11 further comprising the step of displaying on a display unit a plurality of different tattoo designs available for customer selection and displaying said bin designator adjacent to a corresponding one of said tattoo designs.

17. The method of claim 11 further comprising the step of selecting said tattoo enhancement from the group consisting of a non-standard paint, an additional paint color, and a mixture of paint colors.

18. The method of claim 11 further comprising the steps of:
    providing said customer with a receipt that includes at least a total cost of said tattoo and tattoo care instructions.

19. The method of claim 18 further comprising the step of displaying signage sufficient for informing customers that tattoo care instructions are provided on said receipt, whereby consumer are prompted to request a receipt if one is not offered by an attendant.

20. The method of claim 11 further comprising the step of storing said stencils in pre-packaged sets, and selecting each set to contain a total of exactly n stencils.

21. The method of claim 20 further comprising the step, of uniquely marking each of said stencils contained in each said set with a number from 1 to n.

22. The method of claim 20 further comprising the step of verifying that a recorded number of stencils of a particular type remaining in inventory correlates to an actual number of stencils of a particular type remaining in inventory by calculating a match code, and comparing the match code with the number of stencils remaining in an opened one of said prepackaged sets.

23. The method of claim 20 further comprising the step of selecting n to be in the range from 6 to 18.

24. A tattoo studio kit comprising:
a display unit for displaying a plurality of tattoo designs;
a bin designator schedule for cross-referencing a bin designator with a tattoo design, said bin designator identifying a bin in which a stencil for said tattoo design is stored;
at least one bar code disposed within arm's length of said bin and corresponding to one of said tattoo designs;
at least a second bar code associated with a tattoo enhancement;
a scanner for reading said bar codes, said scanner operatively connected to a cash register system to register a sale based on a price determined by said bar codes.

25. A tattoo studio kit comprising:
a display unit for displaying a plurality of tattoo designs;
a bin designator schedule for cross-referencing a bin designator with a tattoo design, said bin designator identifying a bin in which a stencil for said tattoo design is stored;
at least one bar code disposed within arm's length of said bin and corresponding to one of said tattoo designs;
a scanner for reading said bar codes, said scanner operatively connected to a cash register system to register a sale based on a price determined by said bar code.

26. The kit according to claim 25 further comprising means for providing customers with a receipt that includes at least a total cost of said tattoo and tattoo care instructions.

27. The kit according to claim 26 further comprising at least one sign for informing customers that tattoo care instructions are provided on said receipt, whereby consumers are prompted to request a receipt if one is not offered by an attendant.

28. The kit according to claim 25 further comprising pre-packaged sets of stencils, each set containing a total of exactly n stencils that are numbered from 1 to n.

29. The kit according to claim 28 further comprising means for calculating a match code, said match code corresponding to a number of stencils of a particular type that should be remaining in an opened one of said prepackaged sets.

30. A method for operating a tattoo studio comprising the steps of:
receiving a customer selection of a tattoo design;
determining a bin designator based on said selection;
using said bin designator to locate a storage bin containing a stencil stored in pre-packaged sets for said tattoo design that has been selected;
scanning a bar code associated with said stencil that has been selected;
registering a sale based on a price determined by said scanning step; and
verifying that a recorded number of stencils of a particular type remaining in inventory correlates to an actual number of stencils of a particular type remaining in inventory by calculating a match code, and comparing the match code with the number of stencils remaining in an opened one of said prepackaged sets.

* * * * *

UNITED STATES PATENT AND TRADEMARK OFFICE
CERTIFICATE OF CORRECTION

PATENT NO.        : 7,249,712 B2                                                 Page 1 of 1
APPLICATION NO.   : 10/811105
DATED             : July 31, 2007
INVENTOR(S)       : Ingalls It is certified that error appears in the above-identified patent and that said Letters Patent is hereby corrected as shown below:

Column 9
Lines 19 and 32, delete "within arm's length of" and replace with --near--.

Signed and Sealed this

Thirteenth Day of November, 2007

JON W. DUDAS
*Director of the United States Patent and Trademark Office*